G. A. SIDERS.
CORN-PLANTER.
No. 173,352. Patented Feb. 8, 1876.
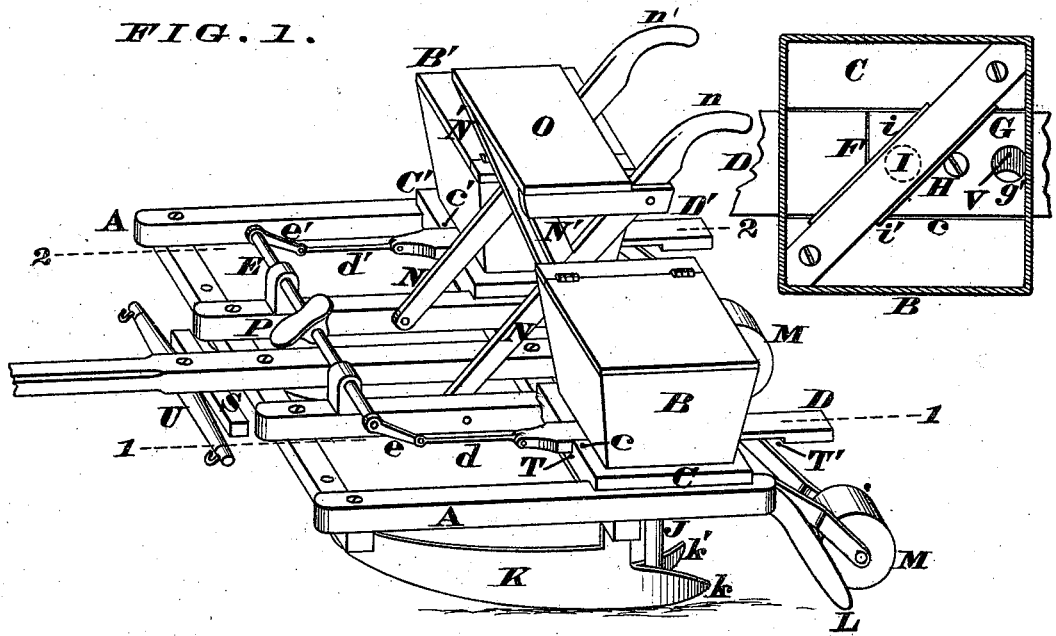
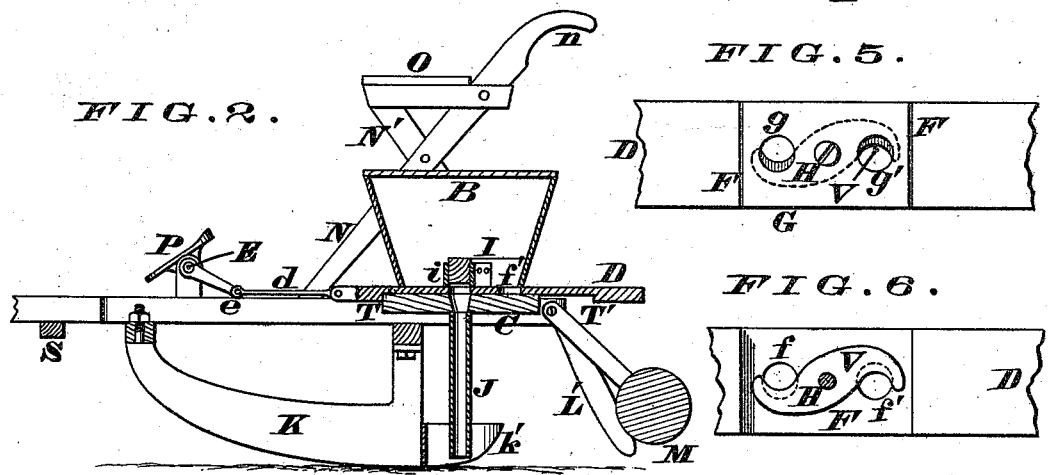
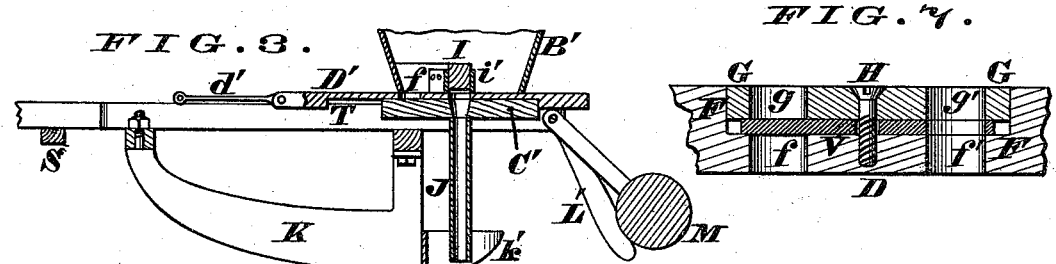
Attest.
Jas. H. Layman
Chas. J. Cock
George A. Siders
by Knight Bros., Att'ys

UNITED STATES PATENT OFFICE.

GEORGE A. SIDERS, OF MICHIGANTOWN, INDIANA, ASSIGNOR OF ONE-HALF HIS RIGHT TO OLIVER P. HANKINS AND NATHAN G. SWASEY, OF SAME PLACE.

IMPROVEMENT IN CORN-PLANTERS.

Specification forming part of Letters Patent No. 173,352, dated February 8, 1876; application filed October 8, 1875.

*To all whom it may concern:*

Be it known that I, GEORGE A. SIDERS, of Michigantown, Clinton county, Indiana, have invented certain new and useful Improvements in Corn-Planters, of which the following is a specification:

My improved corn-planter is arranged so as to plant two rows of corn or other grain at a single operation, the two distinct delivery-slides being actuated at the proper moment by a rock-shaft, to which motion is imparted by a treadle convenient to the driver's foot. Each slide is provided with two grain-cups, whose capacity may be increased or diminished at will, and the contents of these cups are discharged alternately into the spout of the implement by means of a cut-off, which extends diagonally across the bottom of the hopper. Furthermore, the implement is furnished with the customary shares for making the furrows in the ground, and also with rollers, &c., for covering the grain after it has been deposited in the aforesaid furrows.

In the accompanying drawing, Figure 1 is a perspective view of my improved corn-planter. Figs. 2 and 3 are longitudinal sections taken respectively at the lines 1 1 and 2 2. Fig. 4 is a horizontal section through one of the hoppers. Fig. 5 is a plan of one of the seed-slides. Fig. 6 is a similar plan, but with the cap removed. Fig. 7 is a longitudinal section through the slide, the cap being in position.

Of the above illustrations Figs. 4, 5, 6, and 7 are to an enlarged scale.

Mounted upon the main frame A are two hoppers, B B', whose respective bottoms C C' are grooved longitudinally at c c', to receive the reciprocating seed-slides D D', that are actuated from a common rock-shaft, E, by means of the arms e e' and connecting-rods d d'. Each slide is recessed at F, and is perforated at f f', which perforations are in line with the openings g g' of a cap, G, that is fitted in said recess, and securely maintained in position by a bolt or screw, H. This bolt serves as a pivot for the S-shaped cut-off plate V, located beneath the cap G. This plate may be rotated on its pivot H, so as to increase or diminish the area of the delivery-apertures f f', after which said plate is secured in its proper position by screwing down said bolt. This act clamps the plate securely between the cap G and the bottom of the recess F, as clearly shown in Fig. 7. Extending diagonally athwart the hopper is a cut-off, I, having two rubber or other flexible sheets, i i', secured to it, said cut-off serving to force the grain alternately down the openings f and f', respectively, into the grain-spout J. This spout delivers grain between the wings k k', that project from the rear end of a runner, K, whose forward end is curved, as represented, in order that it may the more readily pass over any irregularities or obstructions in the ground. L L' are covering-blades, which throw the loose earth into the furrow made by the runner K and its wings k k'. M are rollers, which pack the loose earth firmly down on the deposited grain. Projecting from the frame A are inclined supports N N', to which is secured the driver's seat O. Two of these supports are prolonged at n n', to serve as handles for the implement. Secured to the rock-shaft E is a treadle, P, located conveniently to the driver's foot. Secured to the pole R is a cross-bar, S, which is located about three and one-half feet from the seed-spouts J, or whatever other distance may be selected for the rows. As soon, therefore, as said bar is brought into a position directly above one row, the driver operates the slide, and thus deposits the grain with the utmost accuracy in the row. T T' are shoulders, which limit the movement of the slide in either direction. U is a customary double-tree.

The operation of my implement is as follows: The plate V in each slide is first set so as to insure the delivery of a proper quantity of grain, after which the hoppers B B' are filled, and the implement is drawn across the field, the driver being mounted upon the seat O. As soon, now, as the cross-bar S is brought into a position directly above the second row in the field, the driver depresses the front end of treadle P, thereby throwing both of the slides D D' as far back as the shoulders T will allow. This act causes the cut-offs i to remove the superfluous grain from the slides, and to force the grain in the cells $f$ down through the spouts J into the furrows made by the runners K $k$ $k'$, after which the deposited grain is covered by the action of blades L L' and rollers M. As soon as the indicator S reaches a position above the third cross-row of the field, the heel of treadle P is depressed, so as to advance the slides D D' as far as the shoulders T' will permit. This act causes the grain to be forced through the apertures $f'$ by the cut-off $i'$.

It will thus be seen that the grain is discharged with the utmost regularity from both of the hoppers by the action of the driver's foot upon the treadle, thereby leaving both of his hands free to manage the team.

The slide being a double-acting one, no time is lost on the back-stroke; but the grain is delivered equally at each advancing and each retracting movement.

The implement can be employed for planting either corn, wheat, sorghum, broom-corn, beans, or cotton-seed, and either in hills or drills.

I am aware that it is not new to operate a pair of seed-slides on a corn-planter by coupling them to a common rock-shaft; but heretofore said shaft has been vibrated by hand, which inconvenient arrangement is effectually obviated by the employment of a treadle, as herein designed and illustrated; therefore,

What I claim as new and of my invention is—

1. In combination with the two hoppers B C B' C', mounted upon the frame A, I claim the double-acting seed-slides D $d$ $f$ $f'$ D' $d'$ $f$ $f'$, rock-shaft E, arms $e$ $e$, diagonal partition I, cut-offs $i$ $i'$, shoulders J J, and treadle P, for imparting motion to the rock-shaft, which actuates the slides, and leaves the driver's hands free, substantially as set forth.

2. The adjustable S-shaped plate V, located beneath the cap G, and adapted to regulate the capacity of the seed-cells, as herein explained.

In testimony of which invention I hereunto set my hand.

G. A. SIDERS.

Attest:
WILLIAM V. JOHNSTON,
OLIVER P. HANKINS.